(12) United States Patent
Lanoue et al.

(10) Patent No.: US 6,223,421 B1
(45) Date of Patent: May 1, 2001

(54) METHOD OF MANUFACTURING A TRANSFORMER COIL WITH A DISPOSABLE MANDREL AND MOLD

(75) Inventors: Thomas J. Lanoue, Cary, NC (US); Wayne Lambert, Bland; Charles Sarver, Rocky Gap, both of VA (US)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/405,587

(22) Filed: Sep. 27, 1999

(51) Int. Cl.⁷ .................................................. H01F 41/06
(52) U.S. Cl. ................. 29/605; 264/272.13; 264/272.19; 336/96
(58) Field of Search .................... 29/605; 264/272.19, 264/272.13; 336/96

(56) References Cited

U.S. PATENT DOCUMENTS

| | | | |
|---|---|---|---|
| 3,041,562 | * 6/1962 | Gammel, Sr. | 336/96 |
| 3,248,468 | 4/1966 | Anderson | 264/272 |
| 3,577,506 | * 5/1971 | Brown | 264/272 |
| 4,337,219 | 6/1982 | Falkowski et al. | 264/130 |
| 4,540,536 | 9/1985 | Altmann et al. | 264/102 |
| 5,036,580 | 8/1991 | Fox et al. | 29/605 |
| 5,056,214 | * 10/1991 | Holt | 29/602.1 |
| 5,197,180 | 3/1993 | Mihalko | 29/596 |
| 5,317,300 | * 5/1994 | Boesel | 336/96 |
| 5,331,730 | * 7/1994 | Brinn, Jr. | 29/606 |
| 5,481,191 | 1/1996 | Rzedzian | 324/318 |
| 5,633,019 | 5/1997 | Clark et al. | 425/116 |

* cited by examiner

Primary Examiner—Carl E. Hall
(74) Attorney, Agent, or Firm—Woodcock Washburn Kurtz Mackiewicz & Norris

(57) ABSTRACT

A method of manufacturing a transformer coil encapsulated in casting resin utilizing a disposable casting mold where the disposable mold acts both as a winding mandrel and as an inner mold shell for resin encapsulation. The disposable casting mold may be oval shaped or circular shaped depending upon the desired shape of the coils to be encapsulated. The inner and outer mold shells are made from thin sheet metal and thus may be adjusted for the manufacture of a wide variety of sizes of oval shaped or circular shaped epoxy encapsulated coils.

17 Claims, 3 Drawing Sheets

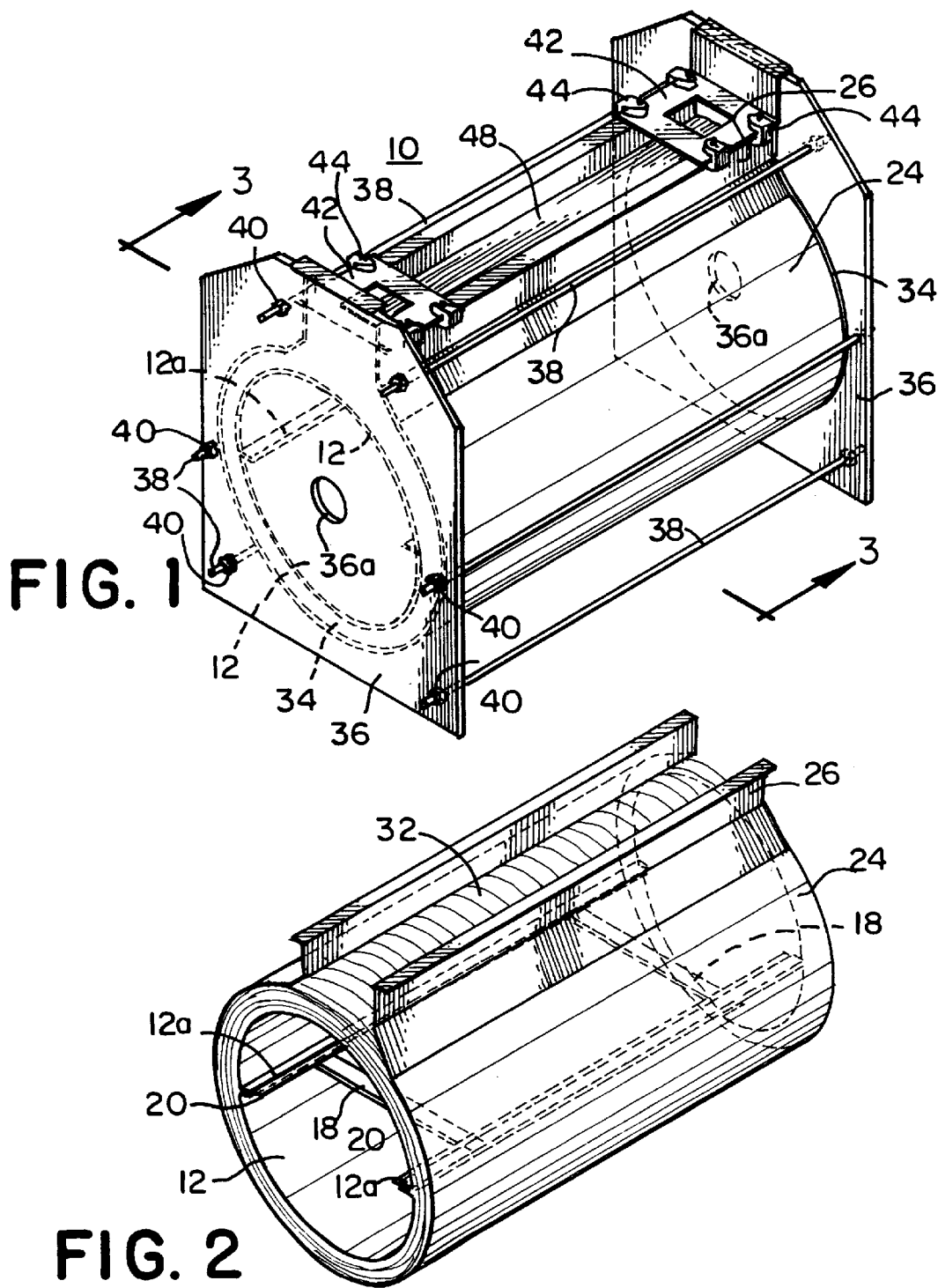

US 6,223,421 B1

METHOD OF MANUFACTURING A TRANSFORMER COIL WITH A DISPOSABLE MANDREL AND MOLD

RELATED APPLICATION

A related application is Ser. No. 09/405,017, filed Sep. 27, 1999, entitled "Method of Manufacturing a Transformer Coil With a Disposable Wrap and and Mold and Integrated Winding Mandrel" filed concurrently herewith by Thomas J. Lanoue, Wayne Lambert and Charles Sarver and assigned to the same assignee as the present application, the disclosure of which is incorporated herein by that reference thereto.

BACKGROUND OF THE INVENTION

1. Field of the Invention

This invention relates to a method of manufacturing transformer windings embedded in casting resin and more particularly to a method of manufacturing a transformer coil encapsulated in casting resin utilizing a disposable casting mold wherein the disposable mold acts both as a winding mandrel and as an inner mold shell for resin encapsulation. The invention is particularly suited to the manufacture of non-standard oval shaped or circular shaped epoxy encapsulated coils for dry type distribution transformers.

2. Description of the Prior Art

Currently the state of the art is precision made standard sized re-usable round shaped mandrels and molds in fixed size increments with costly tap inserts. Examples of prior art methods of encapsulating transformer coils are disclosed in U.S. Pat. Nos. 4,337,219, 4,540,536, 5,036,580 and 5,633,019.

SUMMARY OF THE INVENTION

It is an object of the invention to provide a method of manufacturing a transformer coil encapsulated in casting resin utilizing a disposable casting mold wherein the disposable mold acts both as a winding mandrel and as an inner mold shell for resin encapsulation. It is a further object of the invention to provide a method of manufacturing a wide variety of oval or circular shaped resin encapsulated transformer coils by making the disposable inner and outer molds from low cost sheet metal. The invention process provides the advantages of flexible oval or circular dimensional sizes, flexible and incremental oval or circular shapes providing substantially reduced mandrel and molding costs, elimination of costly standard mold storage, elimination of the need for standard winding mandrels, and facilitates the opportunity to manufacture transformer coils in a round to oval configuration.

In accordance with the foregoing objects and advantages the present invention provides a method of manufacturing a transformer coil encapsulated in casting resin utilizing a disposable casting mold wherein the disposable mold acts both as a winding mandrel and as an inner mold shell for resin encapsulation. The method comprises the steps of forming an annular inner mold of predetermined shape around a winding mandrel of a coil winding machine to produce an integrated winding form/mandrel/inner mold for use in the winding process, placing the integrated winding/ mandrel/inner mold in a winding machine, winding a coil around the inner mold while in the winding machine, removing the inner mold and coil wound thereon from the winding machine, forming an annular outer mold of predetermined shape over the finished coil to provide a manufactured coil and mold assembly, providing a seal for the manufactured coil and mold assembly to prevent casting resin leaks during the encapsulation process, filling the mold assembly with casting resin to encapsulate the coil, permitting the casting resin to harden on the coil, and removing the encapsulated coil from the casting mold assembly.

In accordance with another aspect of the invention the annular outer mold is provided with a mold dome. The method of the invention includes placing gasket material at the ends of the inner and outer molds and placing end plates against the material on the ends of the inner and outer molds to form a casting mold. The method further includes placing coil support plates at the top and each end of the mold dome of the outer mold to support the weight of the coil during encapsulation and curing processes, applying a predetermined compression force to the end plates ofthe casting mold and placing the casting mold containing the wound coil in a horizontal position in an evacuated chamber and pouring casting resin into an opening in the mold dome in the outer mold of the casting mold to encapsulate the coil.

In accordance with another aspect of the invention, the inner and outer molds are formed of sheet metal.

In accordance with another aspect of the invention, the predetermined shape of the inner and outer molds is oval shaped for the production of an oval coil.

In accordance with another aspect of the invention the predetermined shape of the inner and outer molds is circular shaped for the production of a round coil.

In accordance with another aspect of the invention at least one of the inner and outer molds is of one-piece construction.

In accordance with another aspect of the invention the inner mold includes inturned flanges at the radial ends of the sheet metal and removably secured together mechanically for ease of mold disassembly and the method includes the step of placing a gasket between the inturned flanges of the innermold before removably securing together the flanges and applying a liquid sealant to the outside of the mold gasket area.

In accordance with a further aspect of the invention, the method includes the step of applying a resin release agent to all exposed surfaces of the inner mold, applying a glass net to the exposed surfaces of the inner mold after the application of the resin release agent and prior to winding the coil onto the inner mold.

In accordance with a further aspect of the invention, the method includes the step of applying a glass net over the finished coil winding and applying a resin release agent to the inside of the outer mold prior to placing the outer mold over the coil.

In accordance with another aspect of the invention, the method includes the step of installing a plurality of compression rods to interconnect the end plates, and applying a torque to the compression rods to apply the predetermined compression force to the end plates of the casting mold.

In accordance with another aspect of the invention at least one of the inner and outer molds is of two-piece construction.

For a more detailed disclosure of the invention and for further objects and advantages thereof, reference is to be had to the following description taken in conjunction with the accompanying drawings.

BRIEF DESCRIPTION OF THE DRAWINGS

FIG. 1 is a perspective view of a casting mold assembly useful in practicing the method of the present invention.

FIG. 2 is a perspective view of the mold assembly similar to FIG. 1 but with certain parts removed for purposes of clarity.

DESCRIPTION OF THE PREFERRED EMBODIMENT

Figure 3:
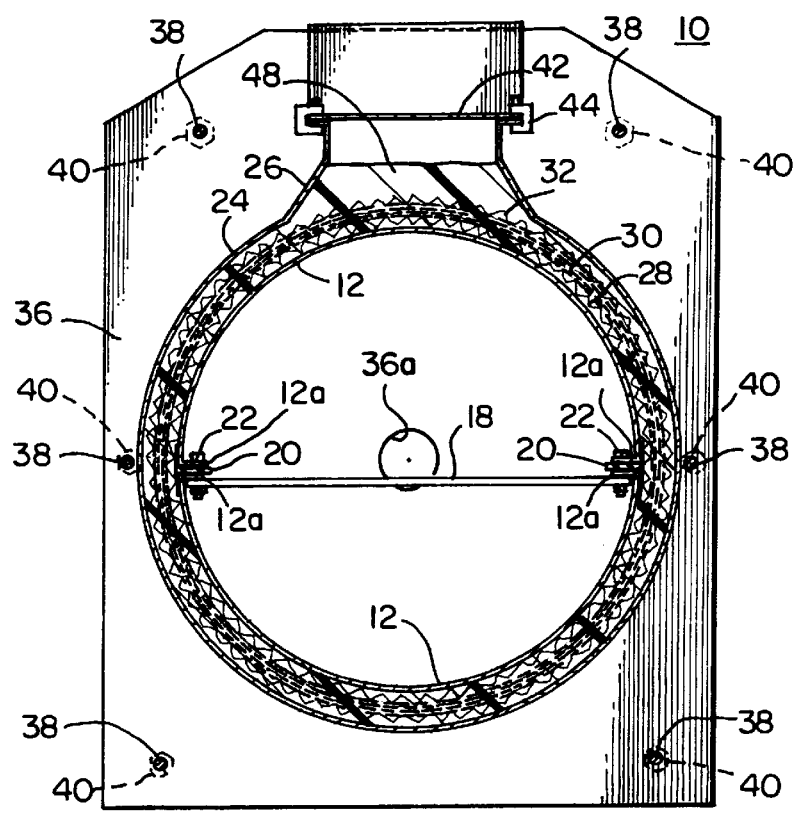
FIG. 3 is a sectional view taken along the lines 3—3 in FIG. 1.

The present invention is particularly suited for manufacturing non-standard oval or round shaped epoxy encapsulated high voltage coils for dry type distribution transformers. The invention to be described herein includes a new process of winding a high voltage oval or round coil over a disposable mold which acts as both a winding mandrel and an inner mold shell for epoxy encapsulation. The invention also includes a simple technique of making the inner and outer molds using low cost sheet metal. The complete winding and molding processes can all be conducted on a standard winding machine for either aluminum or copper conductors wound as in a layer or disk type format. Referring to the drawings it will be seen that FIGS. 1–4 relate to a casting mold assembly for manufacturing a round or circular transformer coil in accordance with the present invention and FIGS. 5 and 6 relate to a casting mold assembly for manufacturing an oval shaped transformer coil in accordance with the present invention.

Referring to FIG. 1 there is illustrated a casting mold assembly 10 useful in practicing the method of the present invention. A mold assembly 10 includes an annular inner mold 12 of predetermined shape. As may be seen in FIG. 2 the inner mold 12 is of circular shape and preferably is formed from thin sheet metal so that it is disposable and inexpensive. In one form of the invention the inner mold 12 was formed from a mill standard mild steel of 0.048 thickness commonly referred to as 18 gauge material. For transformer coil KVA classes larger than 1500 KVA, a 14 gauge material is preferred. The inner mold 12 may be made of one piece or two piece construction. The two-piece construction is illustrated in FIGS. 1–3. The preferred fabrication method is roll forming, however, conventional press break multiple bending step processing is possible for the two-piece mold construction illustrated in FIGS. 1–3. The inner mold 12 has flanges 12a which may be secured mechanically by either bolting or clamping. A gasket material, such for example as 6.3 mm rubber (not shown) is inserted between the mold flange components 12a for sealing and spacing. The spacing generated by the gasket greatly enhances the ease of mold disassembly. Mechanical strength of both the round and oval coil design requires internal support longitudinally across the coil to maintain shape consistently. Typically there are three mechanical supports equally spaced inside the mold 12, beginning at about 4 inches from the end of the mold. In the embodiment illustrated in FIGS. 1–4 for the round coil two inner mold support bars 18 have been illustrated. The ends of the inner mold support bars 18 are connected to spacer bars 20 by bolts 22, FIG. 3.

The annular outer mold 24, FIGS. 2 and 3, is fabricated into either a round or oval shape and is constructed of 18 gauge or 1.22 mm thick cold rolled steel so as to be disposable. The outer mold 24 is of one-piece construction with an integrated dome and tap area 26. The tap or dome area 26, being an open exposed area of the coil and mold, makes it well suited for the epoxy filling position for the encapsulation process. This also serves as a reserve area for make up of any epoxy shrinkage.

The following is a detailed step by step manufacturing process for construction of a cast coil in accordance with the present invention. The sheet metal inner mold 12 is prepared by installing a rubber gasket to the flanges of the mold and securing it by bolting or clamping. A liquid silicone sealant preferably is applied to the outside of the mold gasket area and permitted to air dry for a predetermined period. It has been found that a minimum of four hours for air drying is suitable and this can take place during the winding process. The inner mold 12 is then installed onto an expanding mandrel of a standard winding machine (not shown) and expanded until secure. An epoxy release agent preferably is applied to all exposed surfaces of the inner mold 12 in accordance with recommendations of the epoxy manufacturer. A pre-pregnated glass net material 28 is applied to the innermold 12 to ensure good surface coverage. It is preferable that the glass net be applied with the large strands in the radial direction of the coil. Sectional strips may be used on the outer surface of the coil to reduce material content. A coil winding 30 is then applied by the winding machine to the inner mold 12. A pre-pregnated glass net 32 is then installed over the finished coil winding 30 to provide an outer layer of glass net which also is preferably applied radially. The outer mold 24 is then installed and secured over the finished coil 30. This process may be performed while the inner mold 12 is on the mandrel or it may be performed at a remote assembly site.

Figure 4:
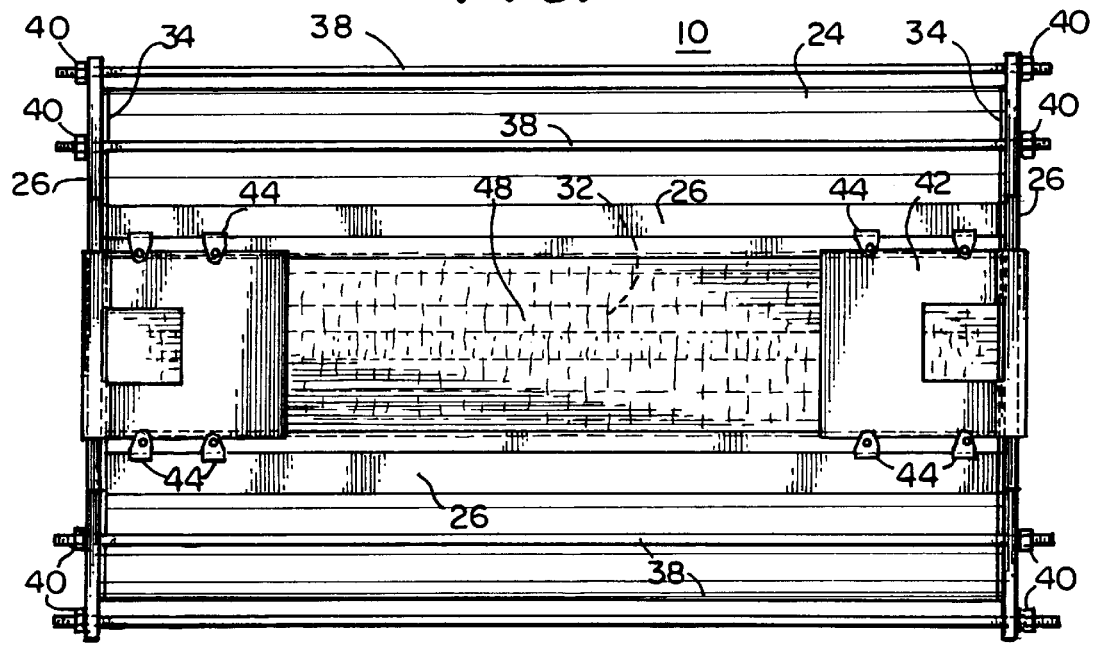
FIG. 4 is a top plan view of the mold assembly illustrated in FIG. 1.

After the coil 30 is removed from the winding equipment, the inner support members 18 are inserted. These support members 18 maintain the coil shape on large coils and remain inside the inner mold 12 during the entire encapsulation process. Prior to installing the outer mold 24, an epoxy release agent is applied to the inside of the outer mold 24. For best results continuous and consistent coverage is essential. Thereafter, the outer mold 24 is installed over the coil winding 30. A gasket material 34 is placed over the inner and outer disposable mold ends as shown in FIGS. 1 and 4. The application of a small amount of suitable adhesive such as super glue to the mold and gasket mating surfaces will aid in securing the gasket 34 to the mold ends. A pair of end plates 36, 36 are set in place against the gasket and mold surfaces and temporarily secured in place while verifying the squareness and positioning of the inner and outer molds 12 and 24. A plurality of compression rods 38 are installed to connect the end plates 36. The compression rods 38 have threaded ends for receiving nut members 40. At this point in the process the nut members 40 are not tightened to apply torque to the compression rods 38. A plurality of coil support plates 42 are installed at the top and each end of the mold dome area 26 using small clamps 44. This will support the weight of the coil 30 during the encapsulation and curing processes. Torque is now applied to the compression rods 38 by tightening the nut members 40. This is preferably done by starting at one side of the end plates and moving in a crossing sequence until torque values in the order of 130 in lbs. to 140 in lbs. is established on all of the remaining compression rods 38. Torque values preferably are established by 40 to 50 in. lb. increments. The length of the inner and outer molds 12 and 24 preferably are manufactured to close tolerances in the order of 0.4 mm. This is desirable for obtaining consistent gasket sealing to end plates. With the process described venting of the innermold area is desirable at the end plates at 36a for equalization of pressure during the casting process.

With the casting mold assembly 10 in a horizontal position it is placed in a vacuum chamber and a casting resin 48, such for example as an epoxy resin, is introduced through the openings in the support plates 42 to fill the mold with the casting resin. Such a vacuum casting process is well known in the art. It is preferable that the mold assembly 10 be maintained horizontal or level during the gelling and curing process. After the curing process has been completed, the outer and inner molds are removed and the encapsulated coil is removed from the casting mold assembly.

Figure 5:
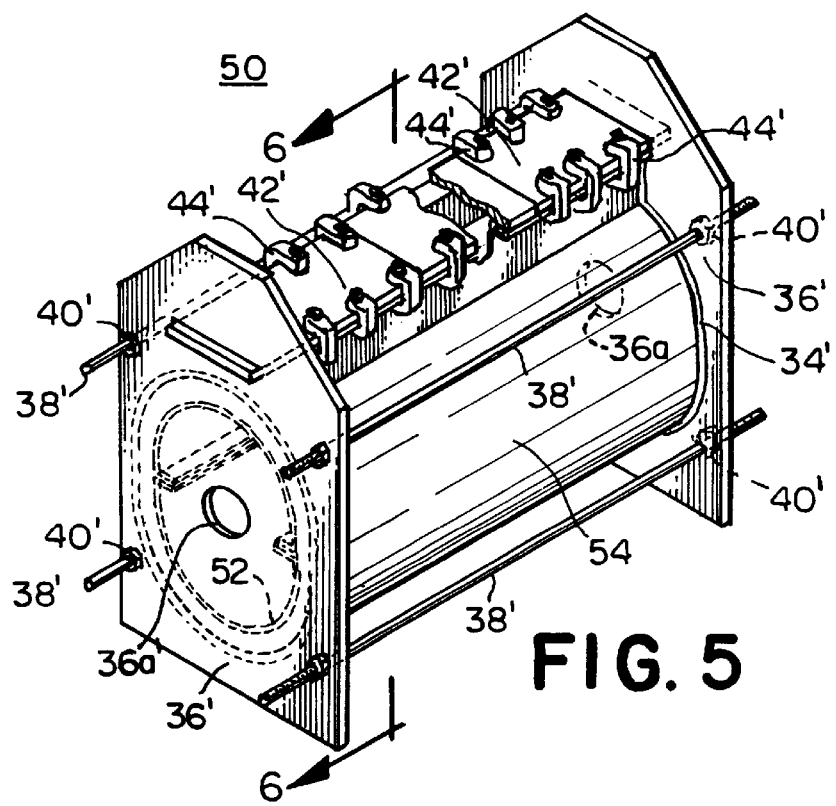
FIG. 5 is a perspective view of a casting mold assembly for manufacturing an oval transformer coil in accordance with the present invention.
Figure 6:
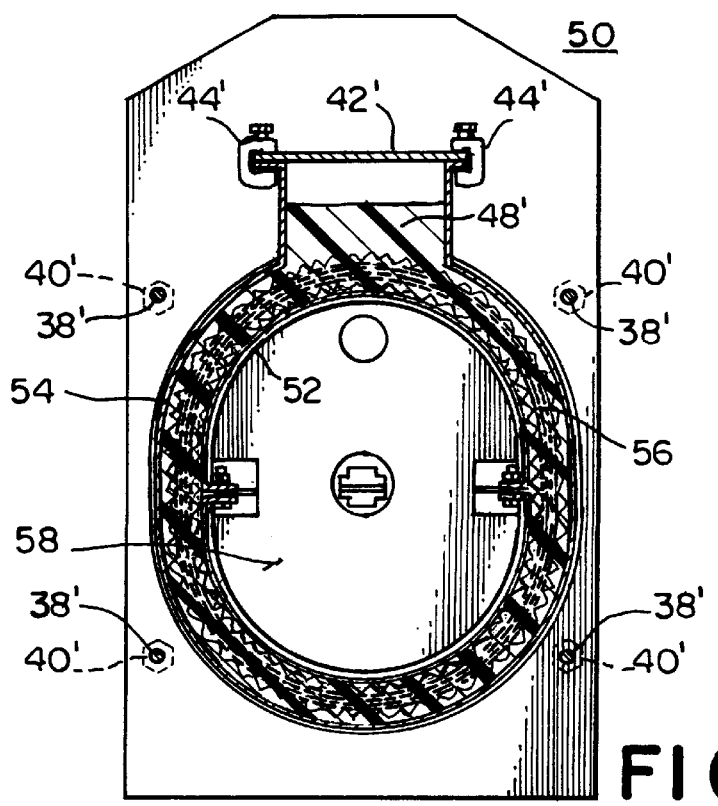
FIG. 6 is a sectional view taken along the lines 6—6 in FIG. 5.

While the present invention has been described in connection with a method of making a round winding configuration in FIGS. 1–4, it is equally applicable to oval winding configurations. The principle difference is in the shape of the inner and outer molds. An example of a mold assembly for oval shaped coils is illustrated in FIGS. 5 and 6. The casting mold assembly 50 shown in FIGS. 5 and 6 includes an oval shaped inner mold 52 and an oval shaped outer mold 54. Both the inner and outer molds 52 and 54 are made of low cost sheet metal similar to the inner and outer molds 12 and 24 illustrated in FIGS. 1–4. A glass net material is applied over the inner mold 52 and a coil winding 56 is then applied by the winding machine to the inner mold 52. Another layer of glass net is then installed over the finished coil winding 56 to provide an outer layer of glass net. The outer mold 54 is then installed and secured over the finished coil 56. Mechanical strength of the oval coil design requires internal support longitudinally across the coil to maintain shape consistency. Typically there are three mechanical supports in the form of disks 58 equally spaced inside the mold, beginning about 4 inches from the end of the mold. The mechanical support work pieces may be fabricated on a punch machine to obtain the oval shape. The material thickness for the inner support may be 14 gauge (1.88 mm) or 11 gauge (3.17 mm). The other parts of the casting mold assembly 50 are similar to the parts of the casting mold assembly 10 and have been identified with similar reference characters with the addition of a prime.

From the foregoing it will be seen that the present invention includes a new process of winding either round or oval transformer coils over a disposable mold which acts as both a winding mandrel and as an inner mold shell for epoxy encapsulation. The invention also includes a simple technique of making the inner and outer molds using low cost sheet metal. The invention has many advantages over conventional fixed sized standard winding mandrels and casting molds. Two of the features or advantages are the use of low cost sheet metal to form a flexible sized oval or circular mandrel and the horizontal molding concept. The complete winding and molding processes can be all conducted on a standard winding machine for either aluminum or copper conductor wound in a layer or disk type format. The process of the present invention provides the advantages of flexible round or oval dimensional sizes, flexible and incremental round or oval shapes providing substantially reduced mandrel and molding costs, elimination of costly standard mold storage, elimination of the need for standard winding mandrels, controlled epoxy thickness for increased dielectric strength and reliability, improved manufacturer ability, reduction in epoxy cost, horizontal epoxy casting and facilitates the opportunity to manufacture transformer coils in a round or oval configuration. The present process using a disposable integrated winding mandrel represents a substantial improvement over the current state of the art which uses precision made standard sized re-usable round shaped mandrels and molds in fixed size increments.

While a preferred embodiment of the present invention has been described and illustrated, it is to be understood that further modifications thereof can be made without departing from the scope of the appended claims.

What is claimed is:

1. A method of manufacturing a transformer coil encapsulated in casting resin utilizing a disposable casting mold comprising the steps of:

forming an annular inner mold of predetermined shape, placing the inner mold onto an expandable winding mandrel of a coil winding machine, winding a coil onto the inner mold, removing the inner mold and coil wound thereon from the winding machine, inserting inner support members within the inner mold to maintain the shape of the coil wound on the inner mold during encapsulation, forming an annular outer mold of predetermined shape having a mold dome, placing the outer mold over the coil, placing gasket material on the ends of the inner and outer molds, placing end plates against the gasket material on the ends of the inner and outer molds to form a casting mold, placing coil support plates at the top and each end of the mold dome of the outer mold to support the weight of the coil during encapsulation and curing processes, applying a predetermined compression force to the end plates of the casting mold, placing the casting mold containing the wound coil in a horizontal position in an evacuated chamber and pouring casting resin through an opening in the mold dome in the outer mold of the casting mold to encapsulate the coil, permitting the casting resin to harden on the coil, and removing the encapsulated coil from the casting mold.

2. A method of manufacturing a transformer coil according to claim 1 wherein the inner and outer molds are formed of sheet metal.

3. A method of manufacturing a transformer coil according to claim 2 wherein the predetermined shape of the inner and outer molds is oval shaped for the production of an oval coil.

4. A method of manufacturing a transformer coil according to claim 2 wherein the predetermined shape of the inner and outer molds is circular shaped for the production of a round coil.

5. A method of manufacturing a transformer coil according to claim 2 wherein the inner mold includes inturned flanges at the radial ends of the sheet metal and removably secured together mechanically for ease of mold disassembly.

6. A method of manufacturing a transformer coil according to claim 2 wherein at least one of the inner and outer molds is of one piece construction.

7. A method of manufacturing a transformer coil according to claim 5 including the step of placing a gasket between the inturned flanges of the inner mold before removably securing together the flanges.

8. A method of manufacturing a transformer coil according to claim 7 including the step of applying a liquid sealant to the outside of the mold gasket area.

9. A method of manufacturing a transformer coil according to claim 1 including the step of applying a resin release agent to all exposed surfaces of the inner mold prior to winding the coil onto the inner mold.

10. A method of manufacturing a transformer coil according to claim 9 including the step of applying a glass net to the exposed surfaces of the inner mold after the application of the resin release agent and prior to winding the coil onto the inner mold.

11. A method of manufacturing a transformer coil according to claim 10 including the step of applying a glass net over the finished coil winding and prior to placing the outer mold over the coil.

12. A method of manufacturing a transformer coil according to claim 11 including the step of applying a resin release agent to the inside of the outer mold prior to placing the outer mold over the coil.

13. A method of manufacturing a transformer coil according to claim 1 including the step of installing a plurality of compression rods to interconnect the end plates, and applying a torque to the compression rods to apply the predetermined compression force to the end plates of the casting mold.

14. A method of manufacturing a transformer coil according to claim 13 wherein the torque applied to the compression rods is in the range of from about 130 in. lbs. to about 140 in. lbs.

15. A method of manufacturing a transformer coil according to claim 2 wherein at least one of the inner and outer molds is of two piece construction.

16. A method of manufacturing a transformer coil encapsulated in casting resin utilizing a disposable casting mold wherein the disposable mold acts both as a winding mandrel and as an inner mold shell for resin encapsulation comprising the steps of:

forming an annular inner mold of sheet metal into a predetermined shape around a winding mandrel of a coil winding machine to produce an integrated winding form/mandrel/inner mold for use in the winding process, placing the integrated winding form/mandrel/inner mold in a winding machine, winding a coil around the inner mold while in the winding machine, removing the inner mold and coil wound thereon from the winding machine, forming an annular outer mold of sheet metal into a predetermined shape over the finished coil to provide a manufactured coil and mold assembly, providing a seal for the manufactured coil and mold assembly to prevent casting resin leaks during the encapsulation process, filing the mold assembly with casting resin to encapsulate the coil, permitting the casting resin to harden on the coil, and removing the encapsulated coil from the casting mold assembly.

17. A method of manufacturing a transformer coil according to claim 16 wherein the annular outer mold is formed over the finished coil and inner mold prior to removal thereof from the winding machine.

* * * * *